(12) United States Patent
Rivas et al.

(10) Patent No.: US 10,637,244 B1
(45) Date of Patent: Apr. 28, 2020

(54) VOLTAGE CONTROL OF A FACTS SHUNT COMPENSATOR

(71) Applicant: ABB Schweiz AG, Baden (CH)

(72) Inventors: Richard Rivas, Västerås (SE);
Jean-Philippe Hasler, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/504,705

(22) Filed: Jul. 8, 2019

(51) Int. Cl.
*H02J 3/18* (2006.01)
*H02J 3/24* (2006.01)

(52) U.S. Cl.
CPC ............... *H02J 3/1835* (2013.01); *H02J 3/24* (2013.01); *Y04S 10/22* (2013.01)

(58) Field of Classification Search
CPC .......... H02J 3/1821; H02J 3/1835; H02J 3/18; Y04S 10/22
See application file for complete search history.

(56) References Cited

U.S. PATENT DOCUMENTS

| | | | | |
|---|---|---|---|---|
| 2003/0011348 | A1* | 1/2003 | Lof | H02J 3/381 322/37 |
| 2014/0175887 | A1* | 6/2014 | Shao | H02J 3/16 307/72 |
| 2014/0379157 | A1* | 12/2014 | Das | H02J 3/14 700/295 |
| 2015/0311718 | A1* | 10/2015 | Divan | H02J 3/18 323/208 |

OTHER PUBLICATIONS

Fan, Xio; Youbin, Zhou; Lin, Ruan; Kunpeng, Zhou; Tao, Wang; Kan, Cao; Study on Coordinated Control Strategy of Reactive Power Compensation Device in DC Converter Station with New-generation Synchronous Condensers, Powercon IEEE, Nov. 8, 2018, pp. 2966-2971. (Year: 2018).*
Stiger, A; Rivas, R; Halonen, M; Synchronous Condensers Contribution to Inertia and Short Circuit Current in Cooperation with STATCOM, Mar. 23, 2019, IEEE, pp. 955-959. (Year: 2019).*
Cui, Ting; Shen, Yangwu; Zhang, Bin; Zuo, Jian; Guo, Hu; "Coordinated Voltage Control of Synchronous Condensers Using Wide-Area Measurements"; IEEE, Dec. 2016, pp. 38-42. (Year: 2018).*
Cui et al., "Voltage Control for Wind Power Integraed Power Systems with Synchronous Generators and SVCs", IEEE, 2017, pp. 477-482 (6 pages).
Zabaiou et al., "Coordinating Control of Static VAR Compensators and Synchronous Generators Based on Selected Remote Measurements", Electric Power Components and Systems, vol. 39, No. 5, Mar. 2011, (1 page abstract).

* cited by examiner

*Primary Examiner* — Harry R Behm
(74) *Attorney, Agent, or Firm* — Birch, Stewart, Kolasch & Birch, LLP

(57) ABSTRACT

A method for voltage control of a static synchronous compensator, STATCOM, or a static var compensator, SVC, is presented. The method is performed in a control device. The method includes obtaining a synchronous condenser, SC, error, obtaining a STATCOM or SVC voltage setpoint, adjusting the obtained STATCOM or SVC voltage setpoint with the obtained SC error to a total STATCOM or SVC voltage reference, and providing the total STATCOM or SVC voltage reference for voltage control of the STATCOM or SVC. A control device and a computer program for voltage control of a STATCOM or an SVC are also presented.

17 Claims, 5 Drawing Sheets

VOLTAGE CONTROL OF A FACTS SHUNT COMPENSATOR

TECHNICAL FIELD

The present disclosure relates to a method, control device and computer program for voltage control of a FACTS shunt compensator, i.e. a STATCOM or SVC.

BACKGROUND

A hybrid compensator for handling of power system transients or other disturbances in a power network can comprise both a flexible ac transmission systems (FACTS) shunt compensator and a synchronous condenser (SC). The FACTS shunt compensator can be either a static synchronous compensator (STATCOM) or a static var compensator (SVC). A FACTS shunt compensator has a much faster response than an SC, and an SC is further not controllable via control actions in case of fast power system transients.

One problem for hybrid compensators is that the response time for the whole installation (H-SC) is adversely affected.

SUMMARY

One objective is to reduce the response time of a voltage control of a hybrid compensator.

According to a first aspect there is provided a method for voltage control of a FACTS shunt compensator. The FACTS compensator can be either a static synchronous compensator (STATCOM) or a static var compensator (SVC). The method is performed in a control device. The method comprises obtaining a synchronous condenser (SC) error, obtaining a STATCOM or SVC voltage setpoint, adjusting the obtained STATCOM or SVC voltage setpoint with the obtained SC error to a total STATCOM or SVC voltage reference, and providing the total STATCOM or SVC voltage reference for voltage control of the STATCOM or SVC.

By adjusting a FACTS shunt compensator voltage setpoint with an SC compensator error, to provide a total FACTS shunt compensator voltage for voltage control of the FACTS shunt compensator, the time response of a voltage control of a hybrid compensator, with both FACTS shunt compensator and SC, is achieved.

The obtaining of an SC error may comprise obtaining a difference between an SC voltage setpoint and a quantity equal to an SC voltage measurement plus a correction term slope*$i_{SC}$ or slope*$Q_{SC}$.

The method may further comprise obtaining a power oscillation damping voltage signal $V_{POD}$, and adding the obtained $V_{POD}$ to the total STATCOM or SVC voltage reference.

The method may further comprise obtaining a slow MVar control voltage signal, and adding the obtained slow MVar control voltage signal to the total STATCOM or SVC voltage reference.

The method may further comprise obtaining a slope adjusted VSC and filter current for the STATCOM, and subtracting the obtained slope adjusted VSC and filter current for the STATCOM from the total STATCOM voltage reference.

The method may further comprise obtaining a slope adjusted SVC current for the SVC, and subtracting the obtained slope adjusted SVC current for the SVC from the total SVC voltage reference.

The method may further comprise, after the adjusting and prior to the providing, limiting the total STATCOM or SVC voltage reference by a voltage maximum and a voltage minimum.

The method may further comprise measuring a STATCOM or SVC voltage, and, subtracting the measured STATCOM or SVC voltage from the limited total STATCOM or SVC voltage reference.

The control device may be a STATCOM or SVC control device.

The control device may be a master control device, the master control device connected to a STATCOM or SVC control device and to a SC control device.

According to a second aspect there is provided a control device for voltage control of a STATCOM or SVC. The control device comprises a processing circuitry and a computer program product. The computer program product stores instructions that, when executed by the processing circuitry, causes the control device to obtain an SC error, obtain a STATCOM or SVC voltage setpoint, adjust the obtained STATCOM or SVC voltage setpoint with the obtained SC error to a total STATCOM or SVC voltage reference, and to provide the total STATCOM or SVC voltage reference for voltage control of the STATCOM or SVC.

The obtain an SC error may comprise obtaining a difference between an SC voltage setpoint and a quantity equal to an SC voltage measurement plus a correction term slope*$i_{SC}$ or slope*$Q_{SC}$.

The control device may further be caused to, after the adjust and prior to the provide, limit the total STATCOM or SVC voltage reference by a voltage maximum and a voltage minimum.

The control device may further be caused to measure a STATCOM or SVC voltage, and to subtract the measured STATCOM or SVC voltage from the limited total STATCOM or SVC voltage reference.

The control device may be a STATCOM or SVC control device.

The control device may be a master control device, the master control device connected to a STATCOM or SVC control device and to a SC control device.

According to a third aspect there is provided a computer program for voltage control of a STATCOM or SVC. The computer program comprises computer program code which, when run in a control device, causes the control device to obtain an SC error, obtain a STATCOM or SVC voltage setpoint, adjust the obtained STATCOM or SVC voltage setpoint with the obtained SC error to a total STATCOM or SVC voltage reference, and to provide the total STATCOM or SVC voltage reference for voltage control of the STATCOM or SVC.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

Figure 1:
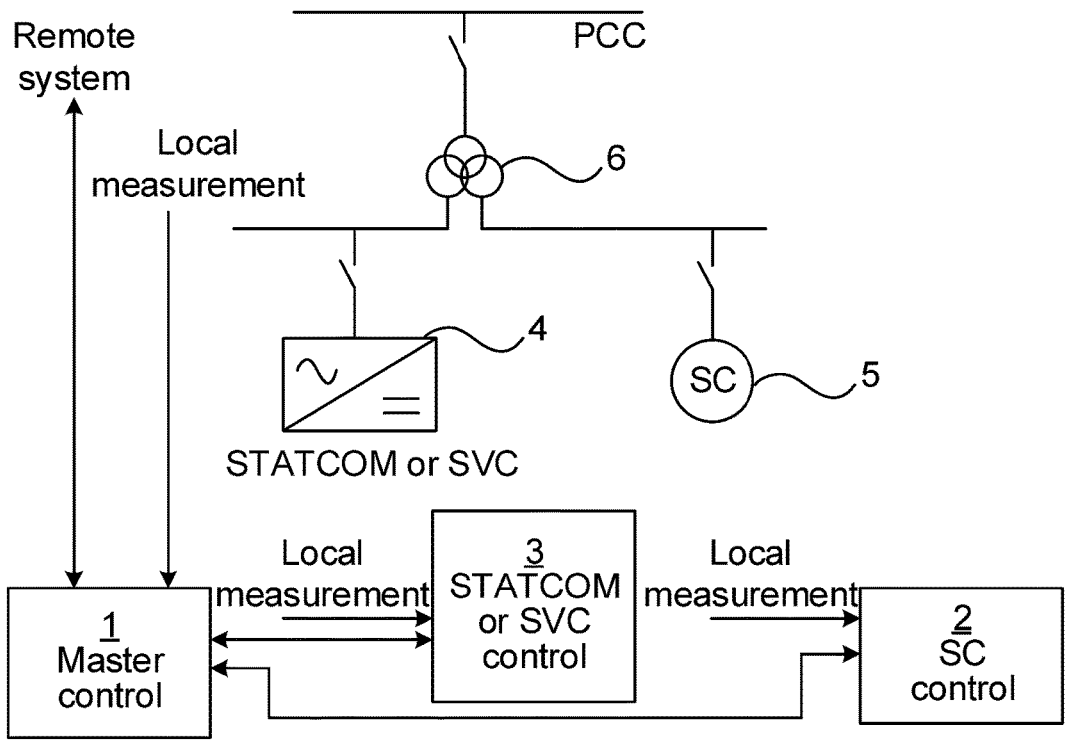
FIG. 1 schematically shows an H-SC in a simplified single-line diagram.

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

A method to speed up the response time of hybrid compensators for power networks, in case of fast transients in a power network, is presented. A hybrid synchronous compensator (H-SC) can comprise synchronous condenser (SC) branches and FACTS shunt compensator branches connected to the same point of common coupling (PCC) via a three winding transformer or different two winding transformers. The FACTS shunt compensator can be either a static synchronous compensator (STATCOM) or a static var compensator (SVC).

During an initial period of a power system transient (10 ms-200 ms), a FACTS shunt compensator is a controllable power electronic device with fast regulation speed, while an SC is not controllable via control actions. In addition, there are communication delays between the control systems of the FACTS shunt compensator and the SC. As a result, the response time of the whole installation H-SC, in case of fast transients in the power network, can be adversely affected.

SCs and FACTS shunt compensators are complementary technologies that can be combined both to take advantage of their individual strengths and to compensate for their respective weaknesses. The combination of both technologies at the PCC is known as hybrid synchronous condenser or H-SC.

For example, FACTS shunt compensator technologies have much faster response than SC technologies, and the response is faster both for setpoint changes and dynamic voltage support in case of disturbance or fast transients in the power network. For FACTS shunt compensators the response time is about between 20 ms and 40 ms, whereas the response time for SCs is about between 1 s and 3 s. It is thus desirable to regulate the FACTS shunt compensator in a H-SC to rapidly compensate for the slower response of the SC.

SC technologies come with simple control systems and contribute with short circuit current, in addition to being able to temporarily provide high reactive power overload, for example for voltage dip mitigation. SCs can also generate transient active power to boost system inertia, and their contribution to system frequency is more significant if they are equipped with flywheels. However, SC technologies come with asymmetric operating regions for stability reasons and have slow response in case of set-point changes or fast transients.

FACTS shunt compensator technologies are flexible alternating current transmission systems (FACTS) that resort to the use of power electronics. FACTS shunt compensator technologies come with symmetric operating regions and fast response control systems. The response is fast both for set-point changes and for dynamic voltage support in case of disturbance in the power network. FACTS shunt compensator technologies can also provide very fast absorption/injection of reactive power during a fault period and after a disturbance (fault recovery period), in addition to high absorption of reactive power in case of over-voltage scenarios. In addition, FACTS shunt compensators can come with capabilities such as active filtering, flicker compensation and power oscillation damping (POD).

However, FACTS shunt compensator technologies cannot provide inertia support unless they are equipped with energy storage systems such as batteries or supercapacitors. In addition, their overload capability is limited in time by the thermal limits of the semiconductors. For example, for STATCOMs the overload capability is also limited by the amount of energy stored in the direct current (DC) capacitors. Moreover, STATCOMs are only able to provide short circuit current contribution up to the rated current, unless a higher value is specified, whereas SVCs are not able to provide short circuit current contribution.

A simplified single-line diagram of an H-SC, wherein embodiments presented herein can be applied, is presented in FIG. 1.

As shown in the figure, the H-SC comprises an SC 5 branch on an SC bus and a FACTS shunt compensator 4 branch on a FACTS shunt compensator bus, both connected to the PCC of a high voltage (HV) grid via a three-winding, three-phase transformer 6. Two or more SC branches and/or two or more FACTS shunt compensator branches may be connected in parallel if required. The FACTS shunt compensator 4 and SC 5 branches may also be connected to the same PCC via different two-winding, three-phase transformers.

The FACTS shunt compensator 4 is controlled by FACTS shunt compensator control device 3. The FACTS shunt compensator control device 3 is configured to control operation of and can measure local data of the FACTS shunt compensator 4. The FACTS shunt compensator control device 3 is also configured to communicate with a master control device 1.

The SC 5 is controlled by SC control device 2. The SC control device 2 is configured to control operation of and can measure local data of the SC 5. The SC control device 2 is also configured to communicate with the master control device 1.

The master control device 1 may be configured to communicate with both the FACTS shunt compensator control device 3 and the SC control device 2. The master control device 1 may be configured to measure local data from the FACTS shunt compensator 4 and/or the SC 5, instead of going through their respective control devices 3 and/or 2. The master control device 1 may further be configured to communicate with remote systems.

SC and FACTS shunt compensator technologies are traditionally supplied with standalone control systems. However, in an H-SC the simultaneous operation of both control systems in a stable manner requires coordination. The coordinating role is here assigned to the master control device 1, which may be configured to monitor, coordinate, and optimize the simultaneous operation of the FACTS shunt compensator and the SC control systems. Control hunting between the two control systems 2 and 3 is thus avoided, and the efficiency of both branches are maximized as a single unit.

Figure 2:
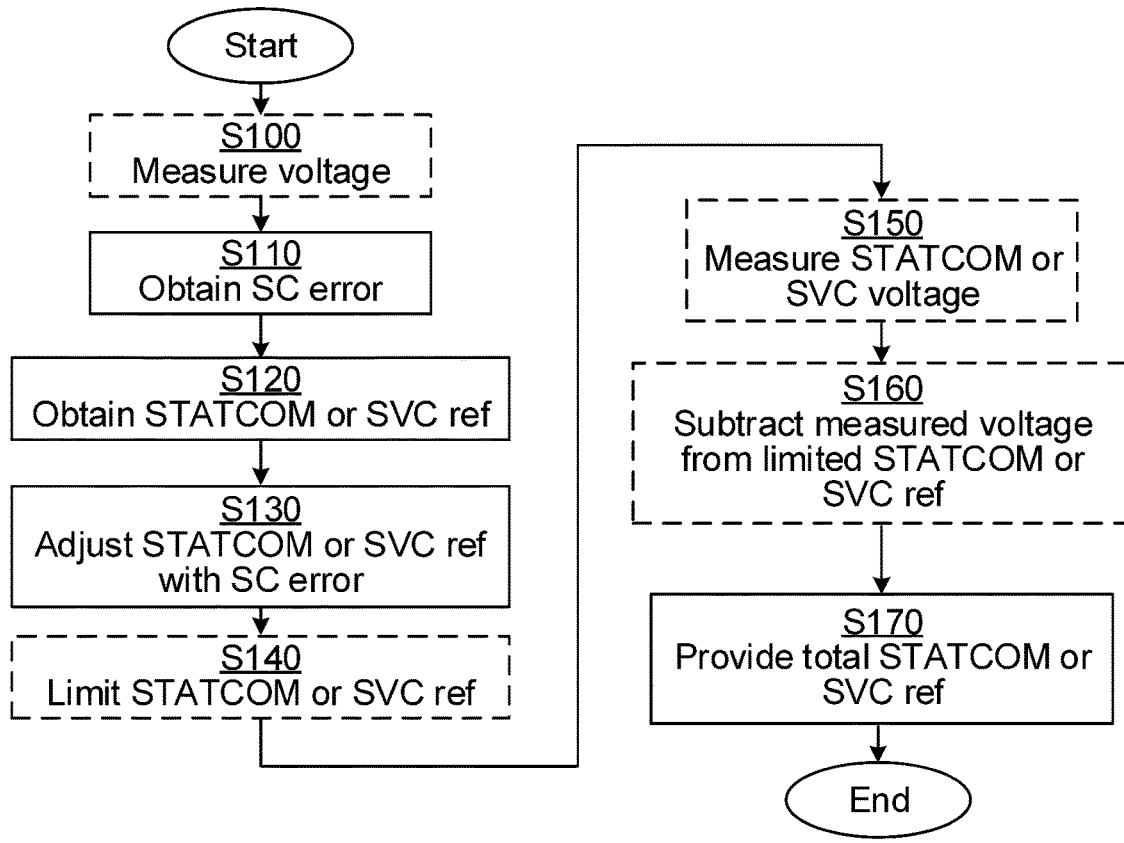
FIG. 2 is a sequence diagram schematically illustrating embodiments of methods presented herein.

According to an aspect, an embodiment of a method for voltage control of a FACTS shunt compensator is presented with reference to FIG. 2. The method is performed in a control device 1 or 3. In processing block S110 the control device obtains an SC error $e_{SC}$. In processing block S120 the control device obtains a FACTS shunt compensator voltage setpoint $V_{ref,VSC}$ or $V_{ref,SVC}$ for the PCC bus. In processing block S130 the control device adjusts the obtained FACTS shunt compensator voltage setpoint with the obtained SC error to a total FACTS shunt compensator voltage reference. In processing block S170 the control device provides the total FACTS shunt compensator voltage reference for voltage control of the FACTS shunt compensator.

The obtained SC error $e_{SC}$ may comprise obtaining a difference between an SC voltage setpoint $V_{ref,SC}$ and a quantity equal to an SC voltage measurement $U_{bus,\,SC}$ plus a correction term slope*$i_{SC}$, or slope*$Q_{SC}$.

In optional processing block S100, before processing block S110, the control device measures a voltage of the FACTS shunt compensator.

Processing block S120 may further comprise obtaining a power oscillation damping (POD) voltage signal $V_{POD}$, and processing block S130 may further add the obtained $V_{POD}$ to the total FACTS shunt compensator voltage reference.

Processing block S120 may further comprise obtaining a slow MVAr control voltage signal $\Delta V_{ref}$ and processing block S130 may further add the obtained slow MVAr control voltage signal $\Delta V_{ref}$ to the total FACTS shunt compensator voltage reference.

For STATCOM processing block S120 may further comprise obtaining a slope*($i_{VSC}+i_{filt}$), and processing block S130 may further subtract the obtained slope*($i_{VSC}+i_{filt}$) from the total STATCOM voltage reference. For SVC processing block S120 may further comprise obtaining a $B_{SVC}*V_{resp}$*slope, and processing block S130 may further subtract the obtained $B_{SVC}*V_{resp}$*slope from the total SVC voltage reference In optional processing block S140, after processing block S130, the control device limits the total FACTS shunt compensator voltage reference by a voltage maximum $V_{max}$ and a voltage minimum $V_{min}$.

In optional processing block S150, after optional processing block S140, the control device measures a FACTS shunt compensator voltage, and in optional processing block S160 the control device subtracts the measured FACTS shunt compensator voltage from the limited total FACTS shunt compensator voltage reference.

The control device may be a FACTS shunt compensator control device 2.

The control device may be a master control device 1, wherein the master control device 1 is connected to a FACTS shunt compensator control device 2 and to a SC control device 3.

The operations shown in FIG. 2 will now be illustrated and described in more detail in conjunction with FIGS. 3-6.

The addition of the SC voltage error (difference between SC voltage setpoint and quantity equal to SC voltage measurement plus correction term slope*$i_{SC}$ or slope*$Q_{SC}$ to the FACTS shunt compensator voltage setpoint is presented.

The results obtained from simulations presented hereafter indicate that the response time of the H-SC improves very significantly, going from the expected SC response of seconds to the expected STATCOM/SVC response of milliseconds. Moreover, the addition of the SC voltage error to the FACTS shunt compensator voltage setpoint is very simple and follows similar implementation as other standard control functions such as droop (slope) control, POD control, and slow MVar control.

Figure 3A:
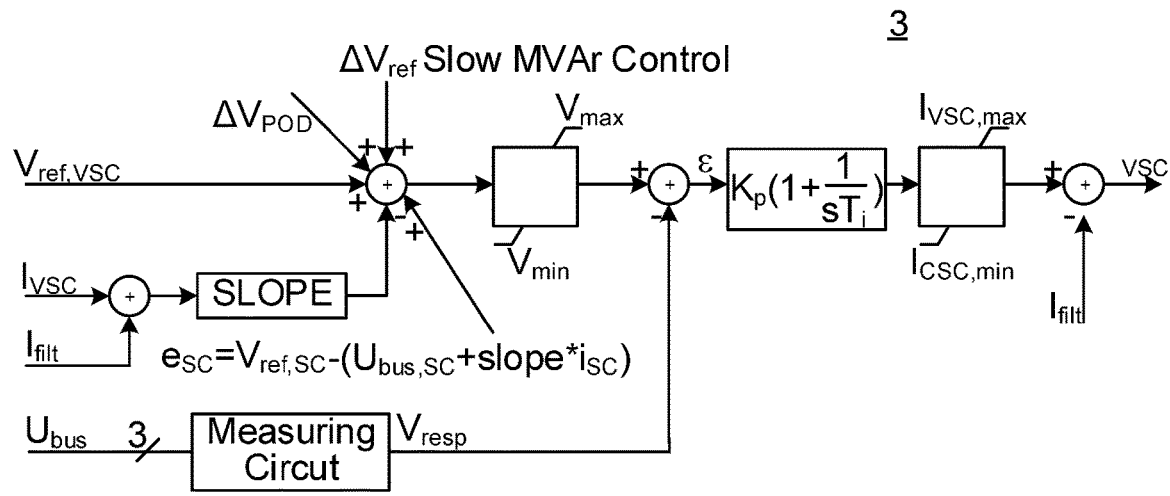
FIGS. 3A-3B schematically show simplified block diagrams of STATCOM and SVC voltage control, respectively.
Figure 3B:
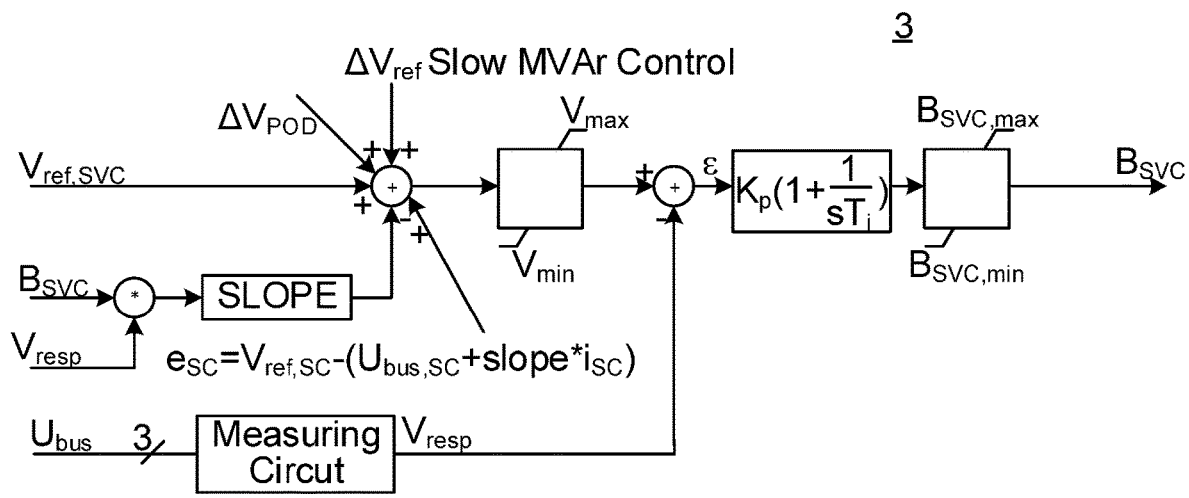

FIGS. 3A and 3B depict simplified diagrams of FACTS shunt compensator's standard closed-loop control for positive sequence voltage. The FACTS shunt compensator's control in FIG. 3A is for a STATCOM voltage control device 3, including SC error compensation. The FACTS shunt compensator's control in FIG. 3*b* is for an SVC voltage control device 3, including SC error compensation.

A FACTS shunt compensator voltage error c for a total voltage reference is fed into a PI regulator after adding/subtracting four terms to/from the STATCOM (FIG. 3A) voltage setpoint $V_{ref,VSC}$, or the SVC (FIG. 3B) voltage setpoint $V_{ref,SVC}$. The terms are a droop control signal, a POD voltage signal, a slow MVAr control voltage signal, and an SC voltage error signal.

For a STATCOM (FIG. 3A) the droop control signal may be the sum of the STATCOM VSC and filter currents, which is multiplied by the slope. This term, slope($i_{VSC}+i_{filt}$), is then subtracted from the STATCOM voltage setpoint $V_{ref,VSC}$.

For an SVC (FIG. 3B) the droop control signal may be the multiplication of the SVC susceptance $B_{SVC}$ and voltage response $V_{resp}$, which is also multiplied by the slope. This term, $B_{SVC}*V_{resp}$*slope, is then subtracted from the SVC voltage setpoint $V_{ref,SVC}$.

The POD voltage signal may be $\Delta V_{POD}$. POD is provided by modulation of the voltage reference in dependence of a measured quantity in the transmission system. The selected input signal is typically active power flow or frequency deviation, but the preferred input signal depends on observability, controllability and location of the FACTS shunt compensator in the power system. The output of the POD is the voltage modulation $\Delta V_{POD}$, which is added to the FACTS shunt compensator voltage setpoint as shown in FIGS. 3A and 3B. The $\Delta V_{POD}$ signal comes from a conventional POD controller/function located in the FACTS shunt compensator control in FIG. 1, but its logic has not been depicted for simplicity.

The slow MVar control voltage signal may be $\Delta V_{ref}$. When an automatic voltage regulator in FIGS. 3A and 3B controls the FACTS shunt compensator or when operating the H-SC in automatic voltage control with both branches (STATCOM/SVC and SC) in service, a higher-level regulator called slow MVar control can be activated. The slow MVar control is slow, compared to the voltage regulators of both branches, and its output signal is added to the voltage reference signal in FIGS. 3A and 3B in such a way that in steady-state the H-SC (or the STATCOM/SVC) will remain within a window defined by two limits, one at the capacitive range and one at the inductive range. The purpose of the slow MVar control is to keep a margin for dynamic operation of the H-SC or the STATCOM/SVC. The $\Delta V_{ref}$ signal comes from a conventional slow MVar controller/function located in the FACTS shunt compensator control or the master control in FIG. 1, but its logic has not been depicted for simplicity.

The SC voltage error signal may be obtained as $V_{ref,SC}-$slope*$i_{SC}-U_{bus,SC}=V_{ref,SC}-(U_{bus,SC}+$slope*$i_{SC})$. The correction term slope*$i_{SC}$ may be replaced by slope*$Q_{SC}$. The SC is assumed to be controlling the SC bus voltage $U_{bus,SC}$, so the master control calculates the SC voltage setpoint $V_{ref,SC}$ as of the STATCOM (or SVC) voltage setpoint $V_{ref,VSC}$ (or $V_{ref,SVC}$) chosen for the PCC bus. The calculation is done by taking the voltage drop across the transformer $U_{drop,SC}$ into consideration. $U_{drop,SC}$ due to the SC current $i_{SC}$ can be calculated as the difference between the local voltage measurements, i.e. $U_{drop,SC}=U_{bus,SC}-U_{bus,PCC}$. As a result, $V_{ref,SC}=V_{ref,VSC}$ (or $V_{ref,SVC}$)$+U_{drop,SC}$.

The total voltage reference is limited by $V_{max}$ and $V_{min}$ before it is compared with a measured voltage $V_{resp}$. The measuring circuit in FIGS. 3A and 3B transforms the sinusoidal voltages of the PCC bus into alfa-beta quantities and then into the dqo rotating frame. As a result, the sinusoidal voltages in phases abc become a dc quantity $V_{resp}$. The resulting error signal ε is fed into the PI regulator and limited according to the STATCOM (FIG. 3A) current limits $I_{VSC,max}$ and $I_{VSC,min}$, or the SVC (FIG. 3B) susceptance limits $B_{SVC,max}$ and $B_{SVC,min}$. The PI regulator may be $$K_p\left(1+\frac{1}{sT_i}\right),$$

wherein $K_p$ is the proportional gain of the PI regulator, s is the complex variable of the Laplace transform and $T_i$ is the integral time constant of the PI regulator. The regulator output is for the STATCOM (FIG. 3A) current reference $I_{VSC}$, which is obtained after removing the STATCOM filter current $I_{filt}$. The regulator output is for the SVC (FIG. 3B) susceptance reference $B_{SVC}$. The customer specifications along with the component ratings and the design restrictions decide the values of $V_{max}/V_{min}$, $I_{max}/I_{min}$ and $B_{max}/B_{min}$ to select.

By adding the SC voltage error (the difference between SC voltage setpoint $V_{ref,SC}$ and quantity equal to SC voltage measurement $U_{bus,SC}$ plus correction term slope*$i_{SC}$) to the FACTS shunt compensator voltage setpoint $V_{ref,VSC}$ (or $V_{ref,SVC}$), compensation for fast transients is achieved for the combined H-SC. As depicted, the addition is performed similarly to other common control functions such as droop (slope) control, POD control, and slow MVar control.

The FACTS shunt compensator is thus regulated to rapidly compensate for the slower response of the SC. The full current capacity (including its overload capacity, if available) of the STATCOM/SVC may also be used to improve the overall response of the H-SC. The compensation is achieved by the addition of the SC voltage error to the FACTS shunt compensator voltage setpoint. In this way the FACTS shunt compensator will compensate for the SC voltage error while waiting for the SC to catch up.

Figure 4:
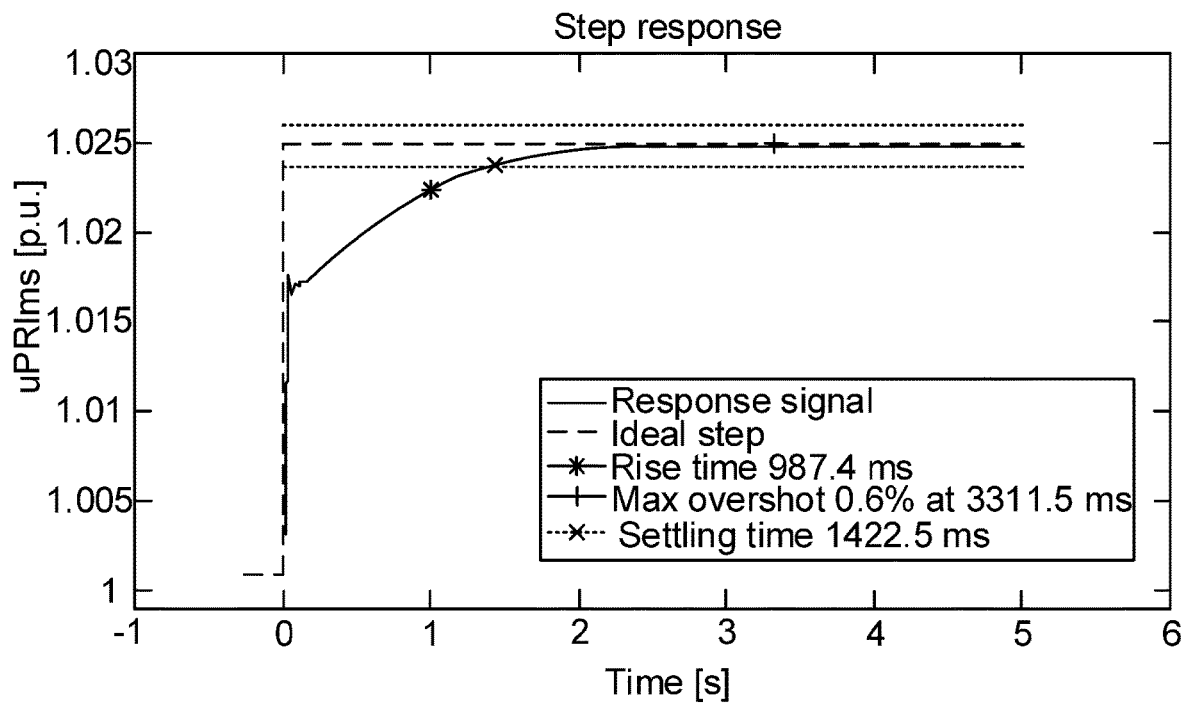
FIG. 4 schematically illustrates a step response test with fast transient compensation disabled.
Figure 5:
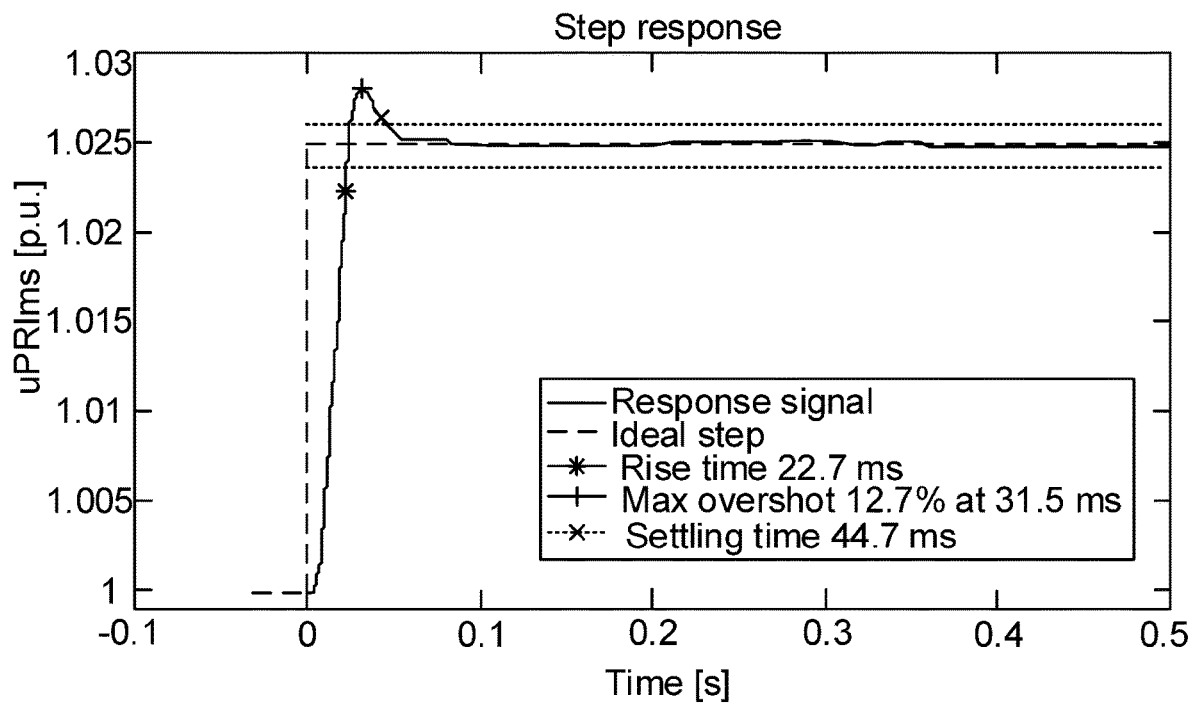
FIG. 5 schematically illustrates a step response test with fast transient compensation enabled.

The effectiveness of this function has been verified by simulation with a step response test. The simulated system is an H-SC system, with has equal power rating per branch, in this case a STATCOM branch rated 70 MVar and an SC branch rated 70 MVar. The short circuit level (SCL) at the PCC (of 275 kV) is simulated to be 2800 MVA and both STATCOM and SC are simulated to have equal slope of 5%. The step size is 5%. FIGS. 4 and 5 depict the results of the step response test with the fast transient (SC voltage error) compensation function disabled and enabled, respectively. As shown, the response time of the H-SC improves very significantly by diminishing from 987.4 ms in FIG. 4 to 22.7 ms in FIG. 5.

The simulated step response signal is illustrated in a solid line. The ideal step response is illustrated in a dashed line. uPRIms [p.u.] stands for rms PCC voltage in per unit and rms stands for root mean square.

In FIG. 4, with the SC voltage error compensation disabled, the maximum overshot is 0.6% at 3.3115 s, with a settling time at 1.4225 s.

In FIG. 5, with the SC voltage error compensation enabled, the maximum overshot is 12.7% at 31.5 ms, with a settling time at 44.7 ms.

The control device has been illustrated as implemented in the STATCOM (or SVC) control, but may alternatively be implemented in a master control device instead. The master control and the STATCOM/SVC control are assumed to be implemented on the same hardware platform, whereas the SC control is assumed to be implemented on a different hardware platform. However, the SC control may alternatively be implemented on the same hardware platform as the master control and the STATCOM/SVC control.

The best mode of use for this function is to add it to a so-called master control device, for the coordinated and stable operation of FACTS shunt compensator and SC control systems.

A master control device 1 may come with a number of objective functions to achieve its goals. Some of the functions are objective functions from the point of view of optimization, whereas others are simply coordinating functions, control functions, control strategies and/or calculation functions. Expected functions to have in a master control device are for example: 1) coordinated voltage control and reactive power sharing, 2) power loss minimization, 3) fast transient compensation, 4) inertia support maximization, and 5) losses calculation.

Figure 6:
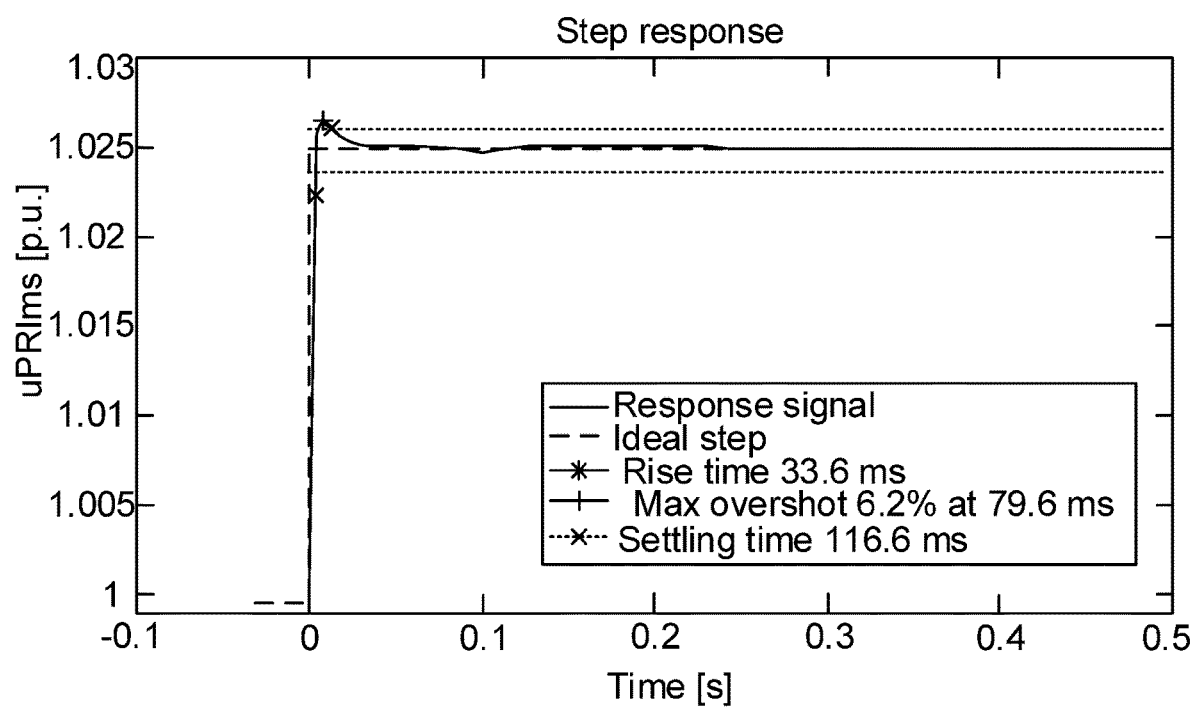
FIG. 6 schematically illustrates a step response test with fast transient compensation by temporarily reducing slope.

In an alternative solution the FACTS shunt compensator slope, for example a STATCOM, is reduced during the fast transient. As a result, the STATCOM will temporarily assume more load to compensate for the slower response of the SC. For example, the slope can be varied linearly between a minimum value (e.g. 2%) and a setting chosen by the operator (5% in this example). FIG. 6 depicts the result obtained for the same system and step size as FIGS. 4 and 5. As shown, the response time of the H-SC goes to 33.6 ms. The maximum overshot is 6.2% at 70.6 ms, with a settling time at 1116.6 ms. The preferred settings to use will depend on customer specifications in addition to component ratings and design restrictions.

Another solution is to use the SC for offset control (and inertia support) and the FACTS shunt compensator for continuous control. With production of 700 MVar capacitive with the SC and 0 MVar with the FACTS shunt compensator, for example a STATCOM, and then applying the step response test to go from 70 MVar to 140 MVar capacitive, the response time is in the 20-40 ms range due to the STATCOM's fast response. In another scenario 70 MVar capacitive is produced with the SC and absorbed with the STATCOM so that the reactive power at the PCC turns out to be zero. The response time to go from 0 MVar to 140 MVar capacitive is also in the 20-40 ms range. In addition, the initial offset from the SC could rapidly be achieved by using the proposed SC voltage error compensation function. The SC voltage error compensation function can be enabled/disabled by using a simple logic switch to choose between SC error $e_{SC}=V_{ref,SC}$-slope*$i_{SC}-U_{bus,SC}$ and SC error $e_{SC}=0$.

A drawback of this second alternative solution is the increase of the losses due to the continuous operation of the STATCOM/SVC for the compensation of the SC output.

Possible communication delays between a remote system and the control device is only relevant for the interaction between the remote system and the SC control. Such communication delays may be compensated for by the fast transient compensation function presented herein.

According to an aspect, an embodiment of a control device 1 for voltage control of a FACTS shunt compensator (STATCOM or SVC). The control device is presented with reference to FIG. 7. The control device 1 comprises a processing circuitry 10 and a computer program product 12, 14 storing instructions that, when executed by the processing circuitry 10, causes the control device 1 to obtain an SC error, obtain a FACTS shunt compensator voltage setpoint, adjust the obtained FACTS shunt compensator voltage setpoint with the obtained SC error to a total FACTS shunt compensator voltage reference, and to provide the total FACTS shunt compensator voltage reference for voltage control of the STATCOM or SVC.

The obtaining of an SC error may comprise obtain a difference between an SC voltage setpoint and a quantity equal to an SC voltage measurement plus a correction term slope*$i_{SC}$. The SC error may alternatively use slope*$Q_{SC}$ as correction term instead of slope*$i_{SC}$, where $Q_{SC}$ is the reactive power produced or absorbed by the SC.

The control device may further be caused to, after the adjust and prior to the provide, limit the total FACTS shunt compensator voltage reference by a voltage maximum and a voltage minimum. The control device may further be caused to measure a FACTS shunt compensator voltage, and to subtract the measured FACTS shunt compensator voltage from the limited total FACTS shunt compensator voltage reference.

The control device has been illustrated as a master control device 1, but may instead be a FACTS shunt compensator control device 3.

The master control device 1 may by connected to a FACTS shunt compensator control device 3 and to a SC control device 2.

According to an aspect, an embodiment of a computer program for voltage control of a FACTS shunt compensator (STATCOM or SVC) is presented. The computer program comprises computer program code which, when run in a control device 1 or 3, causes the control device to obtain an SC error, obtain a FACTS shunt compensator voltage setpoint, adjust the obtained FACTS shunt compensator voltage setpoint with the obtained SC error to a total FACTS shunt compensator voltage reference, and to provide the total FACTS shunt compensator voltage reference for voltage control of the STATCOM or SVC.

Figure 7:
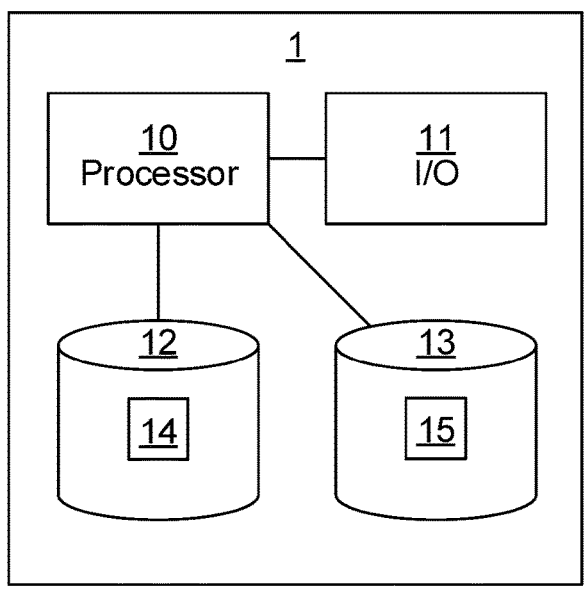
FIGS. 7-8 are diagrams schematically illustrating some components of devices presented herein.

FIG. 7 is a schematic diagram showing some components of the master control device 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 2.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the master control device 1.

The master control device 1 may further comprise an input/output (I/O) interface 11 including e.g. a user interface. The master control device 1 may further comprise a receiver configured to receive signalling from other nodes, and a transmitter configured to transmit signalling to other nodes (not illustrated). Other components of the master control device 1 are omitted in order not to obscure the concepts presented herein.

Figure 8:
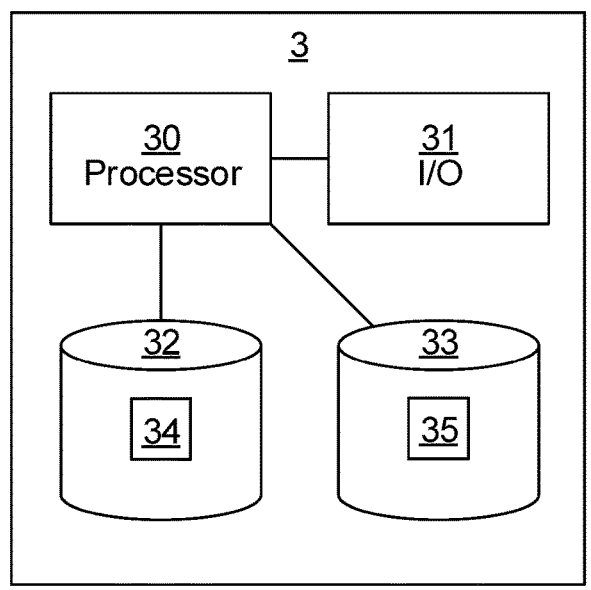

FIG. 8 is a schematic diagram showing some components of the FACTS shunt compensator control device 3. The processing circuitry 30 may be provided using any combination of one or more of a suitable central processing unit, CPU, multiprocessing circuitry, microcontroller, digital signal processing circuitry, DSP, application specific integrated circuit etc., capable of executing software instructions of a computer program 34 stored in a memory. The memory can thus be considered to be or form part of the computer program product 32. The processing circuitry 30 may be configured to execute methods described herein with reference to FIG. 2.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processing circuitry 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the FACTS shunt compensator control device 3.

The FACTS shunt compensator control device 3 may further comprise an input/output (I/O) interface 31 including e.g. a user interface. The FACTS shunt compensator control device 3 may further comprise a receiver configured to receive signalling from other nodes, and a transmitter configured to transmit signalling to other nodes (not illustrated). Other components of the master control device 1 (e.g. other objective functions) and the FACTS shunt compensator control device 3 (e.g. slow Mvar control and POD control) are omitted in order not to obscure the concepts presented herein.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for voltage control of a static synchronous compensator, STATCOM, or a static var compensator, SVC, the method being performed in a control device, the method comprising:

obtaining a synchronous condenser, SC, error;
obtaining a STATCOM or SVC voltage setpoint;
adjusting the obtained STATCOM or SVC voltage setpoint with the obtained SC error to a total STATCOM or SVC voltage reference; and
providing the total STATCOM or SVC voltage reference for voltage control of the STATCOM or SVC.

2. The method according to claim 1, wherein the obtaining of an SC error comprises obtaining a difference between an SC voltage setpoint and a quantity equal to an SC voltage measurement plus a correction term slope*$i_{SC}$ or slope*$Q_{SC}$.

3. The method according to claim 1, further comprising:
obtaining a power oscillation damping voltage signal $V_{POD}$; and
adding the obtained $V_{POD}$ to the total STATCOM or SVC voltage reference.

4. The method according to claim 1, further comprising:
obtaining a slow MVar control voltage signal; and
adding the obtained slow MVar control voltage signal to the total STATCOM or SVC voltage reference.

5. The method according to claim 1, further comprising:
obtaining a slope adjusted VSC and filter current for the STATCOM; and
subtracting the obtained slope adjusted VSC and filter current for the STATCOM from the total STATCOM voltage reference.

6. The method according to claim 1, further comprising:
obtaining a slope adjusted SVC current for the SVC; and
subtracting the obtained slope adjusted SVC current for the SVC from the total SVC voltage reference.

7. The method according to claim 1, further comprising, after the adjusting and prior to the providing, limiting the total STATCOM or SVC voltage reference by a voltage maximum and a voltage minimum.

8. The method according to claim 7, further comprising:
measuring a STATCOM or SVC voltage; and
subtracting the measured STATCOM or SVC voltage from the limited total STATCOM or SVC voltage reference.

9. The method according to claim 1, wherein the control device is a STATCOM or SVC control device.

10. The method according to claim 1, wherein the control device is a master control device, the master control device connected to a STATCOM or SVC control device and to a SC control device.

11. A control device for voltage control of a static synchronous compensator, STATCOM, or static var compensator, SVC, the control device comprising:
processing circuitry; and
a computer program product embodied on a non-transitory computer readable medium and storing instructions that, when executed by the processing circuitry, causes the control device to:
obtain a synchronous condenser, SC, error;
obtain a STATCOM or SVC voltage setpoint;
adjust the obtained STATCOM or SVC voltage setpoint with the obtained SC error to a total STATCOM or SVC voltage reference; and
provide the total STATCOM or SVC voltage reference for voltage control of the STATCOM or SVC.

12. The control device according to claim 11, wherein the obtain an SC error comprises obtaining a difference between an SC voltage setpoint and a quantity equal to an SC voltage measurement plus a correction term slope*$i_{SC}$ or slope*$Q_{SC}$.

13. The control device according to claim 11, further caused to, after the adjust and prior to the provide, limit the total STATCOM or SVC voltage reference by a voltage maximum and a voltage minimum.

14. The control device according to claim 13, further caused to:
measure a STATCOM or SVC voltage; and
subtract the measured STATCOM or SVC voltage from the limited total STATCOM or SVC voltage reference.

15. The control device according to claim 11, wherein the control device is a STATCOM or SVC control device.

16. The control device according to claim 11, wherein the control device is a master control device, the master control device connected to a STATCOM or SVC control device and to a SC control device.

17. A computer program embodied on a non-transitory computer readable medium for voltage control of a static synchronous compensator, STATCOM, or static var compensator, SVC, the computer program comprising computer program code which, when run in a control device, causes the control device to:
obtain a synchronous condenser, SC, error;
obtain a STATCOM or SVC voltage setpoint;
adjust the obtained STATCOM or SVC voltage setpoint with the obtained SC error to a total STATCOM or SVC voltage reference; and
provide the total STATCOM or SVC voltage reference for voltage control of the STATCOM or SVC.

* * * * *